US010337781B2

(12) United States Patent
Crane et al.

(10) Patent No.: US 10,337,781 B2
(45) Date of Patent: Jul. 2, 2019

(54) VARIABLE SPEED DRIVE CONTROL FOR CHILLER COAST-THROUGH

(71) Applicant: JOHNSON CONTROLS TECHNOLOGY COMPANY, Holland, MI (US)

(72) Inventors: Curtis Christian Crane, York, PA (US); Mark Bodell, II, York, PA (US); Curtis G. Rager, Seven Valleys, PA (US); John C. Hansen, Spring Grove, PA (US); Dean K. Norbeck, Marco Island, FL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 828 days.

(21) Appl. No.: 14/421,058

(22) PCT Filed: Aug. 21, 2013

(86) PCT No.: PCT/US2013/055916
§ 371 (c)(1),
(2) Date: Feb. 11, 2015

(87) PCT Pub. No.: WO2014/035745
PCT Pub. Date: Mar. 6, 2014

(65) Prior Publication Data
US 2015/0219378 A1 Aug. 6, 2015

Related U.S. Application Data

(60) Provisional application No. 61/695,123, filed on Aug. 30, 2012.

(51) Int. Cl.
*F25B 49/02* (2006.01)
*H02P 29/024* (2016.01)
*H02P 23/00* (2016.01)

(52) U.S. Cl.
CPC .......... *F25B 49/022* (2013.01); *F25B 49/025* (2013.01); *F25B 2600/021* (2013.01);
(Continued)

(58) Field of Classification Search
CPC . Y02B 30/741; H02P 23/0004; H02P 29/025; F25B 49/022; F25B 49/025;
(Continued)

(56) References Cited

U.S. PATENT DOCUMENTS 6,005,362 A * 12/1999 Enjeti ................... H02M 5/458
  318/375
6,192,687 B1 * 2/2001 Pinkerton ................. H02J 7/34
  60/646

(Continued)

FOREIGN PATENT DOCUMENTS

JP 2007278523 A * 10/2007
JP 2008067518 A 3/2008
(Continued)

OTHER PUBLICATIONS

"Machine Translation of JP2007278523 A, Ueda, Oct. 2007".*
Japanese Notice of Allowance for JP Application No. 2015-529862 dated Nov. 8, 2016, 3 pages.

*Primary Examiner* — Frantz F Jules
*Assistant Examiner* — Martha Tadesse
(74) *Attorney, Agent, or Firm* — Fletcher Yoder, P.C.

(57) ABSTRACT

A chiller system includes a compressor, a condenser and an evaporator in fluid communication. A motor drives the compressor. A variable speed drive powers the motor. An oil heater and pump system circulate heated lubricating oil in the compressor. A control panel is arranged to determine whether an input parameter is greater than or equal to a threshold parameter; deactivate the VSD in response to sensing that the input parameter is less than the threshold parameter; determine at least one chiller capacity control parameter at a point when the VSD is deactivated, and maintain the at least one chiller capacity control parameter while the VSD is deactivated; determine that the input parameter has been restored; determine a motor rotation and motor rotational speed; and in response to determining that the input parameter is restored and the motor is rotating in a forward direction, reactivate the VSD.

16 Claims, 4 Drawing Sheets

(52) U.S. Cl.
CPC . *F25B 2600/0253* (2013.01); *F25B 2700/151* (2013.01); *H02P 23/0004* (2013.01); *H02P 29/025* (2013.01); *Y02B 30/741* (2013.01)

(58) Field of Classification Search
CPC .......... F25B 2700/151; F25B 2600/021; F25B 2600/0253
See application file for complete search history.

(56) References Cited

U.S. PATENT DOCUMENTS

| | | | | |
|---|---|---|---|---|
| 6,686,718 | B2* | 2/2004 | Jadric | H02M 5/458 318/479 |
| 7,081,734 | B1* | 7/2006 | Jadric | H02M 7/797 318/767 |
| 7,208,891 | B2* | 4/2007 | Jadric | B60H 1/00428 318/12 |
| 7,607,896 | B2* | 10/2009 | Leuthen | H02H 7/1222 417/44.1 |
| 8,004,803 | B2* | 8/2011 | Schnetzka | H02H 7/1216 318/563 |
| 2005/0122752 | A1* | 6/2005 | Schnetzka | H02M 7/125 363/50 |
| 2006/0061320 | A1* | 3/2006 | Ma | H02P 6/08 318/801 |
| 2006/0208685 | A1* | 9/2006 | Schnetzka | H02H 9/001 318/800 |
| 2007/0063668 | A1* | 3/2007 | Schnetzka | H02J 9/062 318/812 |
| 2007/0151272 | A1 | 7/2007 | Cosan et al. | |

FOREIGN PATENT DOCUMENTS

| | | |
|---|---|---|
| JP | 2009163776 A | 7/2009 |
| JP | 2009236429 A | 10/2009 |
| WO | 99/41830 A1 | 8/1999 |

* cited by examiner

VARIABLE SPEED DRIVE CONTROL FOR CHILLER COAST-THROUGH

CROSS-REFERENCES TO RELATED APPLICATIONS

This patent application claims priority from and the benefit of U.S. Provisional Patent Application Ser. No. 61/695,123, filed Aug. 30, 2012, entitled "VARIABLE SPEED DRIVE CONTROL FOR CHILLER COAST-THROUGH", which is hereby incorporated by reference.

BACKGROUND

The application generally relates to a method of controlling a chiller system using a variable speed drive (VSD). The application relates more specifically to the use of a variable speed drive (VSD) to maintain cooling capacity during short electrical power interruptions, more commonly known as "ride through" or "coast through".

Many cooling applications and processes rely upon a continuous flow of coolant or cooling capacity. Interrupting a process or production line cooling application due to a momentary power failure may result in significant product loss and lengthy recovery downtime, resulting in great expense and loss of revenue. Preventing such a loss is of significant value.

Short duration power interruptions can damage rotating equipment if power is restored while the compressor motor is coasting down. Damage can occur if the applied power is out of phase with the power generated by the coasting motor due to negative sequence torques that can break motor shafts and compromise motor electrical insulation. In some existing chiller systems the VSD or chiller control panel can detect a power loss within a fraction of a line cycle and quickly shut down the chiller to prevent damage.

Currently during a power interruption, the motor starter is disengaged, electrical power is inhibited from the chiller, and the chiller mechanical driveline is stopped until the fault clears. Typically restarting the cooling system includes a safe coast down cycle, lubrication cycle, and restart cycle, which add two to four minutes to the cooling system restart process, during which there is no cooling capacity delivered to the cooling load. Due to this pause in the chiller system restarting process, in a production process a thermal build-up of heat must be removed before the production process can return to capacity. Quick restart capabilities may be employed to shorten the effects of a power interruption, however; the chiller must come to a complete stop before restart can begin.

Semiconductor Equipment and Materials International (SEMI) Standard F47-0706 Specification for Semiconductor Processing Equipment Voltage Sag Immunity sets requirements and recommendations for voltage sag immunity for equipment used in semiconductor manufacturing. Chillers and adjustable speed drives are listed as a secondary focus of SEMI F47. In a ride-through situation with a drive (output power remains controlled), input voltage sag will result in an input current spike and torsional transient. To keep a drive active during larger voltage sags, the drive would need to be greatly oversized to prevent over current trips—an extremely expensive solution.

SEMI F47 Pass/fail criteria for Subsystems and Components, states: "May not perform at full rated operation but recovers operation without operator and/or host controller intervention."

Therefore there is a need for a controller in a chiller system that can maintain a cooling load over an extended interval upon loss of electrical input power to the chiller system.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a chiller system. A chiller system includes a compressor, a condenser and an evaporator in fluid communication. A motor is connected to the compressor to drive the compressor. A variable speed drive (VSD) powers the motor. A control panel is arranged to determine whether an input parameter is greater than or equal to a predetermined threshold parameter; deactivate the VSD in response to sensing that the input parameter is less than a predetermined threshold parameter level; determine that the input parameter has been restored; determine a motor rotation and motor rotational speed; and in response to determining that the input parameter is restored and the motor is rotating in a forward direction, reactivate the VSD.

Another embodiment relates to a method for coast-through control of a chiller system. The method includes providing a compressor, a condenser and an evaporator in fluid communication, a motor connected to the compressor to drive the compressor, a variable speed drive for powering the motor and an input parameter to the VSD; determining whether the input parameter is greater than or equal to a predetermined threshold parameter; deactivating a VSD output to a compressor motor in response to the input power supply parameter being less than the predetermined threshold parameter; determining if the input parameter is restored; determining the direction of rotation of the motor; in response to the parameter being restored and the motor rotating in a forward rotation: detecting the rotational speed of the motor; adjusting an output frequency of the VSD to approximately the rotational speed of the motor; and adjusting the motor rotational speed to a speed below or equal to about the motor rotational speed before the power fault.

Commonly assigned U.S. Pat. No. 7,005,829 and U.S. Published Pat. App. No. 20060208685, No. 20060196203 & No. 20050122752, disclose various means to implement an active converter module to allow for precharging the DC link of a VSD or a parallel active harmonic filter, and the same are hereby incorporated by reference herein.

Certain advantages of the embodiments described herein are the capability of the VSD to "catch" the spinning chiller compressor, stop deceleration and accelerate the compressor to full or correct operating speed.

Another advantage is the ability to return the chiller system to full operation as fast as possible by restarting with the compressor rotating to maintain chilled water temperature as close to setpoint as possible, through the inertia capabilities of the chilled water circuit, lubrication system, and rotating compressor impeller.

Another advantage is that cooling may be diminished during the short power fault but not stopped as in prior art.

Yet another advantage is full cooling capacity is restored much more quickly, preventing loss of product and revenue.

Still another advantage is the ability to utilize the large reservoir of water and refrigerant in a chiller to provide flywheel effect to enable the coast-through concept.

Alternative exemplary embodiments relate to other features and combinations of features as may be generally recited in the claims.

DETAILED DESCRIPTION OF THE EXEMPLARY EMBODIMENTS

Figure 1:
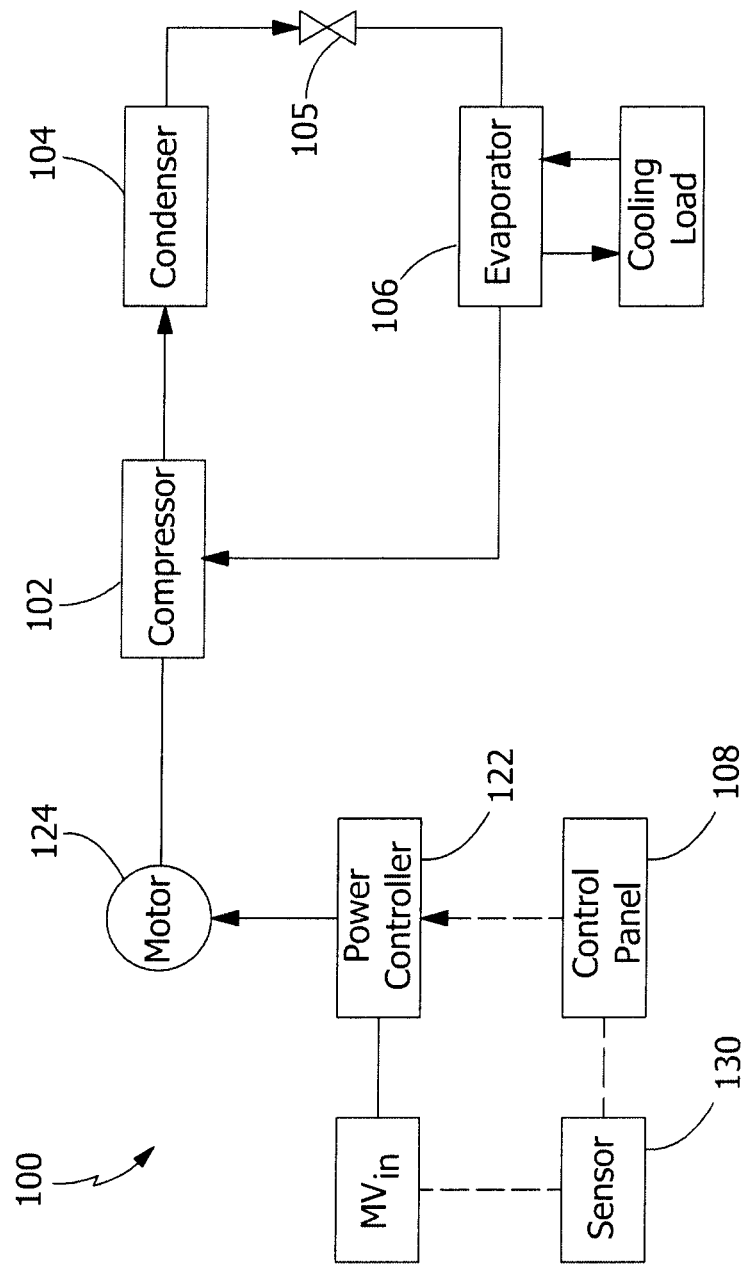
FIG. 1 illustrates an exemplary HVAC, refrigeration or liquid chiller system.

FIG. 1 illustrates generally the HVAC, refrigeration or liquid chiller system 100 of the present invention. As shown in FIG. 1, the HVAC, refrigeration or liquid chiller system 100 includes a compressor 102, a condenser arrangement 104, expansion device(s) 105, a liquid chiller or evaporator arrangement 106 and a control panel 108. A motor 124 can be used to drive the compressor 102, and a medium voltage VSD 122 is close coupled to motor 124 to start motor 124. Motor 124 and VSD 122 are preferably configured for low or medium voltage operation, i.e., input voltages ranging from about 200 V to about 25 kV. In an embodiment compressor 102, condenser arrangement 104, expansion device(s) 105, evaporator arrangement 106, control panel 108, motor 124 and VSD 122 may be mounted together as a structure or integrally mounted to form a chiller system unit. A conventional HVAC, refrigeration or liquid chiller system 100 includes many other features that are not shown in FIG. 1. These features have been purposely omitted to simplify the drawing for ease of illustration.

Motor 124 is a variable speed motor. VSD 122 may be configured for operation at low or medium voltage in order to operate motor 124 at variable speeds.

Compressor 102, driven by motor 124, compresses a refrigerant vapor and delivers the vapor to the condenser 104 through a discharge line. The compressor 102 is preferably a centrifugal compressor, but can be any suitable type of compressor, e.g., screw compressor, reciprocating compressor, etc. The refrigerant vapor delivered by the compressor 102 to the condenser 104 enters into a heat exchange relationship with a fluid, preferably water, and undergoes a phase change to a refrigerant liquid as a result of the heat exchange relationship with the fluid. The condensed liquid refrigerant from condenser 104 flows through an expansion device 105 to an evaporator 106.

The evaporator 106 can include connections for a supply line and a return line of a cooling load. A secondary liquid, e.g. water, ethylene glycol, calcium chloride brine or sodium chloride brine, travels into the evaporator 106 via return line and exits the evaporator 106 via supply line. The liquid refrigerant in the evaporator 106 enters into a heat exchange relationship with the secondary liquid to lower the temperature of the secondary liquid. The refrigerant liquid in the evaporator 106 undergoes a phase change to a refrigerant vapor as a result of the heat exchange relationship with the secondary liquid. The vapor refrigerant in the evaporator 106 exits the evaporator 106 and returns to the compressor 102 by a suction line to complete the cycle. It is to be understood that any suitable configuration of condenser 104 and evaporator 106 can be used in the system 100, provided that the appropriate phase change of the refrigerant in the condenser 104 and evaporator 106 is obtained.

The control panel 108 can include an analog to digital (A/D) converter, a microprocessor, a non-volatile memory, and an interface board to control operation of the refrigeration system 100. Preferably, the control panel 108 can execute a control algorithm(s) to control operation or the power sections of VSD 122. Control of VSD 122 by control panel 108 can provide an operator of the system 100 with a single interface point for controlling the system 100. In one embodiment, the control algorithm(s) can be computer programs or software stored in the non-volatile memory of the control panel 108 and can include a series of instructions executable by the microprocessor of the control panel 108. While it is preferred that the control algorithm be embodied in a computer program(s) and executed by the microprocessor, it is to be understood that the control algorithm may be implemented and executed using digital and/or analog hardware by those skilled in the art. If hardware is used to execute the control algorithm, the corresponding configuration of the control panel 108 can be changed to incorporate the necessary components and to remove any components that may no longer be required.

As discussed above, the control panel 108 can execute a control algorithm(s) to control operation or the power sections of VSD 122. In one embodiment, the control panel 108 can provide all of the controls for the components in VSD 122 and thus, VSD 122 does not require any control interface or corresponding control components. However, in another embodiment of the present invention, the control panel 108 can provide solely control commands or control signals, e.g., start commands, stop commands, etc., to VSD 122 and receive data from the components of VSD 122 regarding the operation of VSD 122, i.e., a data acquisition function. In this embodiment, VSD 122 again does not have any operator control interface, but may have corresponding control components to process the control commands from the control panel 108.

Figure 3:
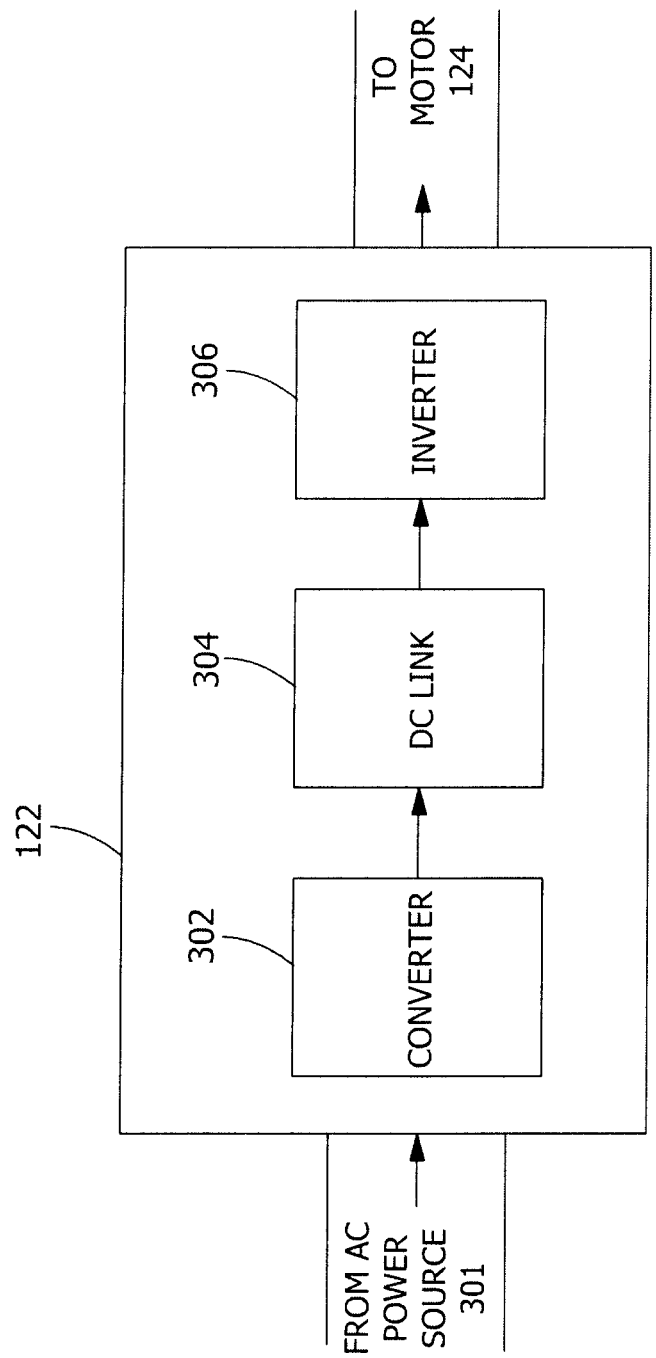
FIG. 3 is a schematic diagram of an exemplary VSD.

Next, FIG. 3 illustrates an embodiment of VSD 122. The VSD 122 can have three stages: a converter stage 302, a DC link stage 304 and an output stage having one inverter 306 or a plurality of inverters 306 (not shown). Converter 302 converts the fixed line frequency, fixed line voltage AC power from the AC power source 301 into DC power. The DC link 304 filters the DC power from the converter 302 and provides energy storage components. The DC link 304 can be composed of capacitors and inductors. Finally inverter 306 converts DC power from DC link 304 into variable frequency, variable voltage AC power for the motor 124. In an alternate embodiment (not shown) inverters 306 may be connected in parallel on the DC link 304 and each inverter 306 converts the DC power from the DC link 304 into a variable frequency, variable voltage AC power for a corresponding motor 124. Inverter 306 can be a power module that can include power transistors, insulated gate bipolar transistor (IGBT) power switches and inverse diodes interconnected with wire bond technology. Furthermore, it is to be understood that the DC link 304 and the inverter 306 of the VSD 122 can incorporate different components from those discussed above so long as the DC link 304 and inverter 306 of the VSD 122 can provide the motors 124 with appropriate output voltages and frequencies.

Since some VSDs produce variable voltage and variable frequency power for powering a motor of a compressor system, a coasting motor—i.e., a rotating motor with no input voltage applied—can be monitored by the VSD for operating parameters such as voltage vector, current vector, phase angles and magnitude. With the availability of the required parameters, once power is restored to the VSD, the VSD can return to operation and the motor accelerated as soon as a power interruption is restored.

If a backup generator is employed in the power system for the chiller, the VSD can control a transfer of input power from the failed utility input mains to the generator, without bringing the chiller to a complete stop. This ability to maintain rotation of the motor/compressor of the chiller system greatly reduces the loss of cooling to a process or critical load.

Chillers such as those manufactured by Johnson Controls, Inc., of Milwaukee, Wis., equipped with, e.g., an Optispeed™ low or medium voltage variable speed drive (VSD 122), can be modified to include a power fault coast-through feature, as described below. The coast-through feature is advantageous for data centers, semiconductor manufacturing, other process and critical applications of liquid chillers. Chillers equipped with coast through capability may continue to operate upon restoration of power, even with power faults of up to 30 seconds in duration.

Depending upon the severity and duration of a power fault, the coast-through capability provided by VSD 122 may provide ongoing chiller operation in various ways. As used herein, the term "power fault" means any loss of input voltage or reduction of input voltage below a predetermined threshold voltage. The threshold voltage may vary based on conditions. A normal threshold voltage may be 85% of rated input voltage (mains voltage), although the threshold voltage may be set anywhere from 40% to 98% of rated input voltage, depending on the application.

Figure 2:
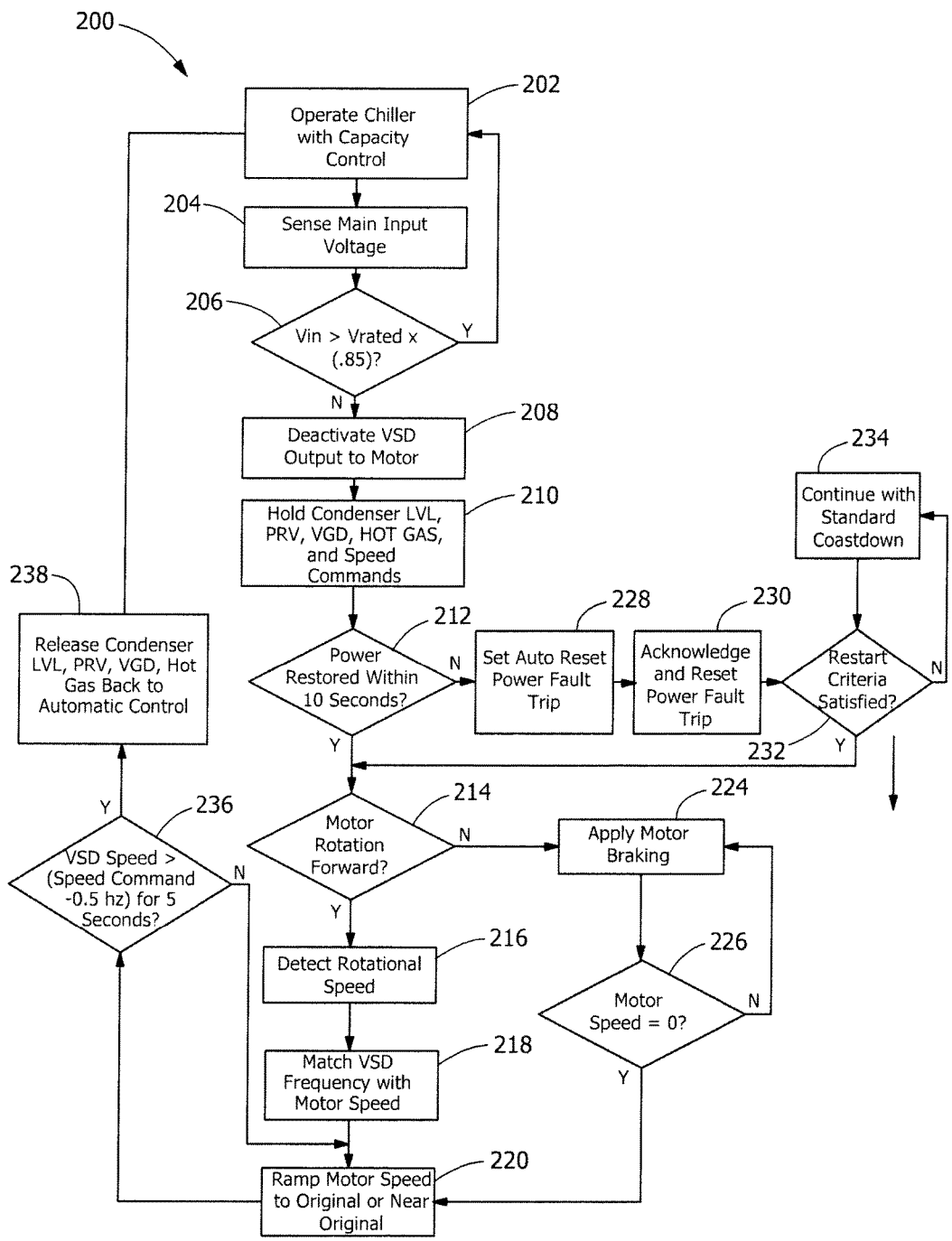
FIG. 2 illustrates a flow diagram of an exemplary method for coast-through control by a medium voltage VSD.

Referring to FIG. 2, a method, generally designated as 200, is disclosed for the present invention. At step 202, during normal operation at full voltage, chiller system 100 is operated using conventional capacity control. At step 204, the control panel 108 senses an input electrical parameter, e.g., input mains voltage, input current, power, frequency or any electrical parameter that is indicative of the loss of input power. While the disclosure that follows refers to sensing of input voltage, it is understood that other parameters may be substituted for input voltage for sensing loss of the input power source and initiating the coast-through control sequence. Next, at step 206, control panel 108 compares the sensed input voltage with a predetermined threshold voltage, e.g., 85% of rated input mains voltage, and determines whether the input voltage is greater than or equal to the predetermined threshold voltage. Note that the voltage threshold may be adjusted to a higher or lower voltage setpoint depending on the capability of VSD 122 to maintain a desired operational voltage at the output of the inverter 306 of VSD 122.

During power fault sags of short duration, where the overall supply voltage detected by sensor 130 associated VSD 122 remains above the predetermined voltage threshold of rated input mains voltage, VSD 122 will be energized and chiller operation and process cooling will not be disturbed. If input voltage remains greater than or equal to the threshold, then system 200 returns to step 202, continuing to operate under capacity control. Otherwise, system 200 proceeds to step 208.

At step 208, when the input power supply voltage sags below the threshold, e.g., 85% of rated input mains voltage overall, VSD 122 deactivates the output to the compressor motor 124. In one embodiment VSD 122 maintains bus voltage charge level for a power fault up to 10 seconds long, using stored energy in the DC link capacitors, the link bus circuit or other sources of internally stored energy. During this time period, the volume of gas in the condenser will cause compressor 102 to slow down and in some cases the power fault may cause compressor 102 to reverse rotation. Whether compressor 102 reverses direction may depend on the duration of the power fault, the size of the compressor, gear ratio, operating lift or head and pre-rotation vane position. A chiller operating at high lift and high capacity is more likely to reach reverse rotation more quickly. Compressor 102 will generally be rotating forward for at least two seconds after a power fault under most operating conditions.

At step 210, control panel 108 determines the capacity control and other operating parameters of the system at the time the voltage sag occurs, and holds, or maintains, the values of the capacity control parameters. E.g., condenser liquid level, pre-rotation vanes (PRV) and/or variable geometry diffuser (VGD) positions, hot gas bypass valve position and VSD speed commands, are maintained at the same settings or values as they were immediately following the voltage sag or loss.

At step 212, a timed interval is initiated when the voltage sag occurs to determine the duration of the voltage sag, i.e., the amount of time that elapsed before voltage is restored to at least 85% of rated voltage. In one embodiment the time interval may be 10 seconds, although more or less time may be used for the timed interval depending on design conditions. If voltage sensor 130 senses a return of input voltage equal or greater than the predetermined threshold voltage and determines that power is restored within the timed interval, VSD 122 proceeds to determine at step 214 if motor 124 is rotating in the forward rotation when power is restored.

If the timed interval at step 212 elapses and power has not been restored to the predetermined threshold voltage, the system proceeds to step 228 and VSD 122 sets a power fault signal. The power fault signal is a signal from VSD 122 to notify control panel 108 of a detected power fault condition. At step 230, control panel 108 acknowledges the power fault and resets an internal supply power fault to suppress a coast down sequence, which sequence may be triggered in the absence of the internal control panel reset.

The system proceeds to step 232, in which control panel 108 monitors a set of restart criteria and determines whether the restart criteria are satisfied. In one embodiment, the restart criteria include the following: oil pressure in the compressor is greater than a minimum pressure, e.g., twenty-five (25) pounds per square inch difference (PSID); the VSD DC link is pre-charged and capable of supplying current to the VSD output inverter; there are no fault indicators or inhibit signals present in the VSD or control panel; and refrigerant is flowing in the chiller evaporator. Commonly-owned U.S. Pat. No. 7,619,906, incorporated herein by reference, discloses an exemplary circuit for pre-charging the DC link of a VSD. If the restart criteria are not satisfied, a standard "coast down" or slowing down of the compressor is continued at step 234, and the control system returns to step 232 to monitor the restart criteria again. The restart criteria may be checked continuously or iteratively. If during a restart interval the restart criteria are satisfied then the system proceeds to step 214. In an embodiment if the restart criteria remain unsatisfied following a predetermined restart interval, e.g., 30 seconds, then the system may optionally abort the restart method 200 and allow the chiller to slow to a complete stop before commencing a full restart of the entire chiller system, which takes several minutes following a complete shutdown of the chiller system and may interrupt process or production line cooling application.

If at step 214, motor 124 is determined to be rotating in reverse rotation when power is restored to equal or greater than the threshold voltage, VSD 122 will detect the reverse rotation of motor 124 and system 200 will proceed at step 224 to apply braking action to slow motor 124 speed to zero. The amount of electric braking power available in the drive is limited. The braking period may take several seconds, but the use of electric braking enables motor 124 and compressor 102 to come to a complete stop in a shorter interval than occurs in an unpowered coast down. At step 226, system 200 determines if motor rotational speed is zero. If not, then the system returns to step 224 to continue applying motor braking. Once motor rotational speed equals zero, or motor 124 comes to a complete stop, VSD 122 proceeds to step 220 and increases the output voltage of inverter 306 to accelerate motor 124 in forward rotation as described below.

If at step 214, motor rotation is forward, then the system proceeds to step 216. At step 216, VSD 122 or control panel 108 will detect the rotational speed of motor 124 after power has been restored. At step 218, the system adjusts the VSD output frequency to approximately match the motor rotational speed accordingly. More specifically the voltage and phase of the VSD output are matched with the voltage and phase at the terminals of motor 124 to synchronously resume speed control of motor 124 by VSD 122. At step 220, VSD 122 gradually increases the speed of motor 124 to a speed that is equal to or slightly less than the original motor operating speed of motor 124 immediately prior to the power fault.

At step 236, control panel 108 monitors the output of VSD 122 and determines if the speed, or frequency, of the VSD output is greater than a threshold value for 5 seconds. If the VSD output speed is not greater than a threshold value, then the system returns to step 220 and continues to ramp the motor speed to approximately the original motor speed, and iteratively repeats the motor speed monitoring step 236 until the motor speed is greater than a threshold value for at least five seconds. The threshold speed may be, e.g., the speed command of the capacity control system, minus 0.5 Hz.

Once the motor speed achieves the desired speed at step 236, system 200 proceeds to step 238. At step 238, control panel 108 transfers control back to the normal chiller capacity automatic control. Condenser liquid level, pre-rotation vanes (PRV) and/or variable geometry diffuser (VGD) positions, hot gas bypass valve position and compressor speed commands, which have been maintained at the pre-fault levels during the coast through process described above, are released and reset to values determined by the capacity control system.

In order to enable the coast through method described above with respect to FIG. 2, a lubricating oil flow must be maintained at an operating temperature to allow the system to resume operation after a power fault. Normally a "cold start" of a chiller system requires a warm up period to permit lubricating oil to be circulated in the compressor, and to heat up to a desired viscosity. When a power fault occurs, oil circulation, temperature and viscosity must be maintained until power is restored.

Figure 4:
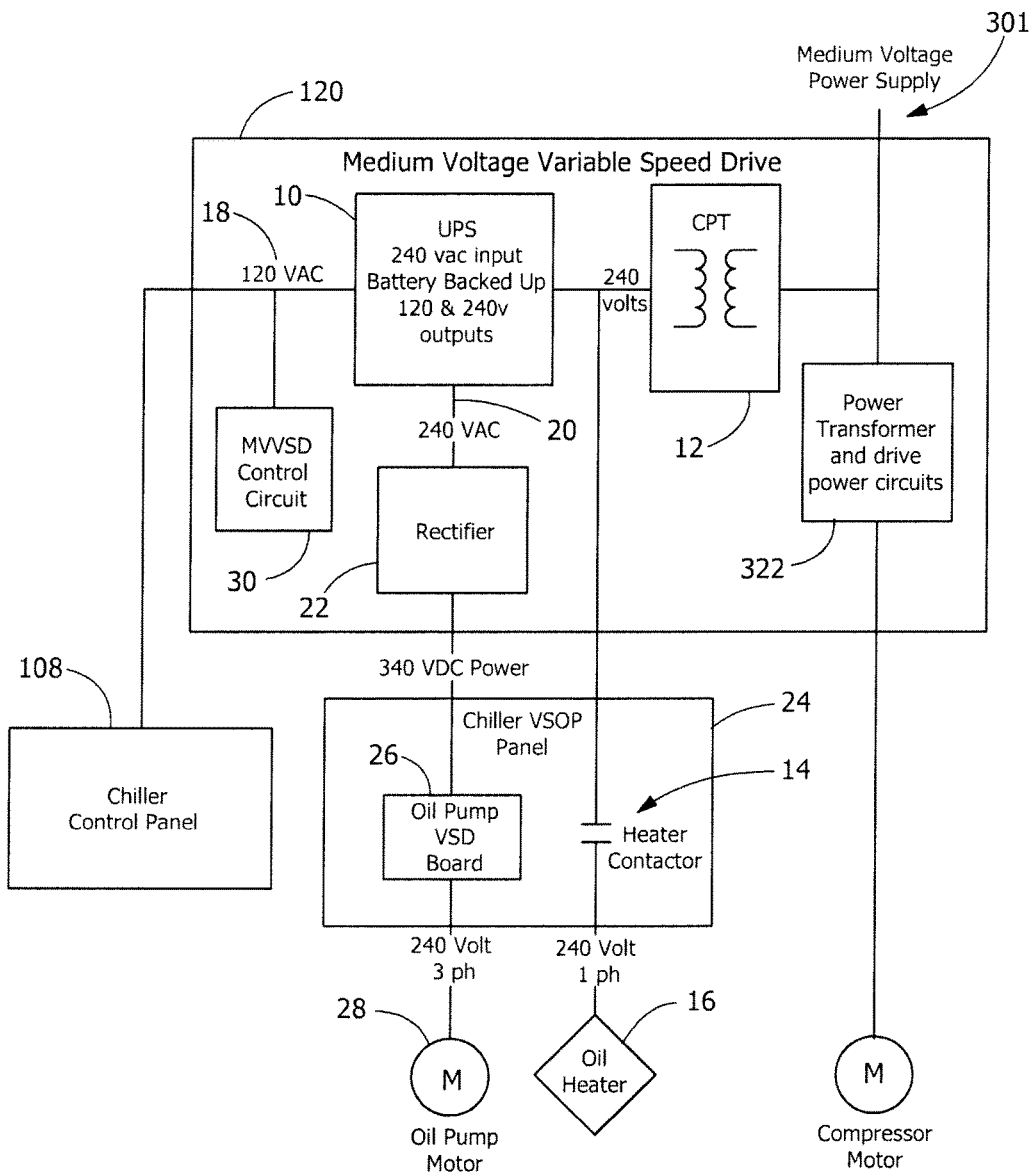
FIG. 4 is a schematic diagram of an uninterruptible power supply (UPS) power distribution system for ancillary loads.

Referring to FIG. 4, an uninterruptible power supply (UPS) 10 is provided in VSD 122 to maintain uninterrupted operation of critical loads during a power fault event. I UPS 10 may be provided as a separately housed unit, or as part of control panel 108. AC power source 301 provides AC input power to a power transformer and drive power circuits 322 of VSD 122. A transformer 12 is connected at the input to VSD 122 to transform input power from AC power source 301 at medium or low voltage, three phase power, to control voltage and power for ancillary loads of the chiller system. In one embodiment transformer 12 may be a single phase transformer with 240 volt, single phase output. UPS 10 is connected at the output of transformer 12, in parallel with a motor starter contactor 14 for controlling operation of an oil heater 16. Oil heater 16 maintains oil in the compressor at a desired operating temperature when energized.

UPS 10 may be rated, e.g., to receive a 240 volt, single phase AC input from transformer 12, and generate separate 120 VAC and 240 VAC, single phase outputs (18 and 20, respectively). UPS further includes a DC battery, a rectifier for converting the AC voltage to DC voltage to power a charging circuit to maintain the battery at a desired level of volt-amps, and an inverter for generating an AC voltage at outputs 18, 20. UPS systems are well known to persons skilled in the art. Output 20 of UPS 10 supplies power to rectifier 22. Rectifier 22 converts the 240 VAC output power from UPS 10 to a DC voltage, e.g., 340 volts, for powering a variable speed oil pump panel 24. Pump panel 24 includes a VSD 26. VSD 26 receives input power at 340 VDC and inverts the DC power to generate three phase power for powering a three phase oil pump motor 28. Motor 28 may be, e.g., rated for 240 VAC. Motor 28 powers an oil pump (not shown) for circulating oil through compressor 102. In an alternate embodiment rectifier 22 may be eliminated from drive 120 if the oil pump VSD 26 is configured for single phase input of 120 VAC or 240 VAC. Other voltages and motor configurations are also within the scope of the disclosure, as will be appreciated by persons skilled in the art. In alternate embodiments, an oil pump may not be included in the compressor configuration, e.g., where the compressor includes magnetic bearings that support the rotating structure via magnetic fields, without mechanical contact. When magnetic bearings are used in lieu of a lubrication system, UPS 10 may be used to power the magnetic bearings, either directly from outputs 18, 20, or indirectly, e.g., through a rectifier, inverter, battery or other suitable device as required by the magnetic bearings.

UPS 10 may also supply AC power to a control circuit 32 in VSD 122, and control panel 108, so that the control system 200 is operative during a power fault. Devices such as microprocessors, memory and interface boards are able to maintain stored parameters of the chiller control panel 108 and VSD control circuits 30 during a power fault, and resume operation immediately following restoration of power to the predetermined threshold level. Thus, the chiller system is able to resume operation immediately following a power fault of up to 30 seconds or more, without having to undergo a complete new startup of the chiller system.

In one embodiment, a counter may be provided to count the number of events or occurrences in which a) an input power or voltage loss is detected and b) the input power subsequently is restored within a configurable period of time—e.g., normally from 10 to 30 seconds. For each such occurrence, the counter is incremented by a single count. The accumulated count may be displayed on the operator interface to inform the user of the number of events in which the system applied the coast-through recovery method disclosed in FIG. 2. Also, an LED or other visual indicator may be provided on the operator interface to display to the operator when such a recovery cycle is taking place.

By combining a limited ride-through capability with coast-through capability, chiller with VSD 122 is able to meet industry standards for voltage sag immunity set forth in SEMI F47. The chiller can ride through or coast through voltage sags or complete power faults, with minimal disturbance to the chilled water cooling or other process.

In an exemplary embodiment, a large York (YK) chiller (K7 compressor) was tested at a JCI facility in York Pa. with a 2000 HP, 4160 volt VSD 122 and coast through modifications. An additional medium voltage variable speed drive, with special software, was used upstream of the Optispeed drive, to generate power sags and fault events.

TABLE R1-1

SEMI F47 Table R1-1 Required Voltage Sag Immunity and Duration Chiller Test Result

| | Voltage, % Sag Depth or "Dip to" | Duration (Tests @ 60 Hz) | % Voltage Detected by Drive | Result |
|---|---|---|---|---|
| Single Phase | 80 | 1 sec | 92 | Ride-through |
| | 80 | 11 sec* | 92 | Ride-through |
| | 70 | 500 ms | 88 | Ride-through |
| | 50 | 200 ms | 81 | Coast-through |
| Phase to Phase | 80 | 1 sec | 86 | Coast-through |
| | 70 | 500 ms | 78 | Coast-through |
| | 50 | 200 ms | 64 | Coast-through |
| Three Phase | 80 | 1 sec | 80 | Coast-through |
| | 70 | 500 ms | 70 | Coast-through |
| | 50 | 200 ms | 50 | Coast-through |

NOTE:
*Minimum 10 seconds at 80% sag depth recommended by SEMI F47

All of the above coast-through events were of short duration, with the compressor decelerating but still rotating forward at the time of restoration of power.

Additional three phase power fault points were tested. Exemplary test points are shown below in Table R1-2:

TABLE R1-2

| Voltage, % Sag Depth | Fault Duration (seconds) | Compressor Rotation at power restoration | Result |
|---|---|---|---|
| 0 | 1 | Forward | Coast-through |
| 0 | 2 | Forward | Coast-through |
| 0 | 3 | Forward/Reverse* | Coast-through |
| 0 | 3.8 | Reverse | Coast-through |
| 0 | 9 | Reverse | Coast-through |
| 0 | 11 | Reverse | Quick Restart |
| 0 | 30 | Reverse | Quick Restart |

NOTE:
The chiller operated in forward rotation from medium load and reverse from high load condition at 3 seconds.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the coast-through VSD control as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

What is claimed is:

1. A chiller system comprising:
   a compressor, a condenser and an evaporator in fluid communication;
   a motor connected to the compressor to drive the compressor;
   a variable speed drive for powering the motor; and
   a control panel configured to:
      deactivate the variable speed drive in response to sensing that an input power to the chiller system is less than a predetermined threshold;
      determine that the input power has been restored in response to sensing that the input power is greater than or equal to the predetermined threshold;
      determine a motor rotation and motor rotational speed; and
      in response to determining that the input power is restored and the motor is rotating in a forward direction, reactivate the variable speed drive.

2. The system of claim 1, further comprising:
   an oil heater and an oil pump system for circulating oil in the compressor; and
   an uninterruptible power system (UPS) configured to power at least the oil heater, the oil pump, and the control panel during an interval wherein the input power is less than the predetermined threshold.

3. The system of claim 1, wherein the control panel is configured to reactivate the variable speed drive by:
   setting an output command to the variable speed drive to a predetermined motor rotational speed;
   setting an output frequency of the variable speed drive to approximately equal the motor rotational speed; and
   increasing the output frequency of the variable speed drive and the motor rotational speed to approximately equal the predetermined motor rotational speed.

4. The system of claim 3, wherein the control panel is further configured to brake the motor rotational speed to zero, and then accelerate the motor rotational speed in a forward rotational direction from zero to the predetermined motor rotational speed, in response to determining that the motor is rotating in the reverse rotation when the input power is restored.

5. The system of claim 1, wherein the control panel is further configured to determine at least one chiller capacity control parameter at a point when the variable speed drive is deactivated, and maintain the at least one chiller capacity control parameter while the variable speed drive is deactivated.

6. The system of claim 5, wherein the control panel is further configured to release the at least one chiller capacity control parameter and reset the at least one chiller capacity control parameter via a capacity control portion of the control panel.

7. The system of claim 1, wherein the control panel is further configured to control the variable speed drive to maintain a predetermined DC bus voltage for up to 10 seconds when the input power is less than the predetermined threshold using stored energy in a capacitor of the variable speed drive.

8. The system of claim 3, wherein the control panel is further configured to control the increase in the output frequency of the variable speed drive by gradually increasing the output frequency.

9. The system of claim 3, wherein the predetermined motor rotational speed is equal to the motor rotational speed at which the motor was rotating prior to sensing that the input power is less than the predetermined threshold.

10. The system of claim 1, wherein the predetermined threshold is between 40% and 98% of a rated input power of the chiller system.

11. A control system for a chiller system comprising:
    a control panel, the control panel configured to:
       deactivate a variable speed drive in response to sensing that an input power to the chiller system is less than a predetermined threshold;
       determine that the input power is restored when the input power is greater than or equal to the predetermined threshold;
       determine a motor rotation and motor rotational speed; and
       in response to determining that the input power is restored and the motor is rotating in the forward direction:
          set an output frequency of the variable speed drive to approximately equal the motor rotational speed; and
          increase the output frequency of the variable speed drive and the motor rotational speed to approximately equal a predetermined motor rotational speed.

12. The system of claim 11, wherein the control panel is further configured to brake the motor rotational speed to zero, and then accelerate the motor rotational speed in a forward rotational direction from zero to the predetermined motor rotational speed, in response to determining that the motor is rotating in the reverse rotation when the input power is restored.

13. The system of claim 11, wherein the control panel is configured to sense whether the input power is less than the predetermined threshold by sensing an input voltage and comparing the input voltage to a predetermined threshold voltage to determine whether the input voltage is less than the predetermined threshold voltage.

14. The system of claim 1, wherein the control panel is configured to:
    determine the motor rotation and the motor rotational speed by measuring a voltage and a phase of a first current at terminals of the motor while the variable speed drive is deactivated; and
    in response to determining that the input power is restored and the motor is rotating in the forward direction, reactivate the variable speed drive to apply a second current having the voltage and the phase to the terminals of the motor.

15. A centrifugal chiller system comprising:
    a motor configured to drive a centrifugal compressor of the centrifugal chiller system;
    a variable speed drive coupled to terminals of the motor and configured to supply power to the motor; and
    a control panel configured to:
       measure an input power to the centrifugal chiller system;
       in response to determining that the input power is less than a predetermined threshold, signal the variable speed drive to deactivate the motor by removing a first current supplied to the terminals of the motor;
       in response to determining that the input power has been restored to greater than or equal to the predetermined threshold, measure a voltage and a phase of a second current at the terminals of the motor and determine a motor rotational direction; and in response to determining a forward motor rotational direction when the input power has been restored, signal the variable speed drive to apply a third current having the measured voltage and the measured phase to the terminals of the motor to reactivate the motor.

16. The system of claim 15, wherein the control panel is configured to:

in response to determining a reverse motor rotational direction when the input power is restored, brake the motor to a rotational speed of zero and then reactivate the variable speed drive to apply a fourth current to the terminals of the motor to accelerate the motor in the forward motor rotation direction.

* * * * *